US009860374B2

(12) United States Patent
Belz et al.

(10) Patent No.: US 9,860,374 B2
(45) Date of Patent: *Jan. 2, 2018

(54) METHOD FOR INDICATING THE CONTEXT OF A CALL TO A CALLED PARTY (71) Applicant: AT&T INTELLECTUAL PROPERTY I, L.P., Atlanta, GA (US)

(72) Inventors: Steven M. Belz, Sunnyvale, TX (US); Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,352

(22) Filed: Sep. 6, 2016

(65) Prior Publication Data

US 2016/0381216 A1    Dec. 29, 2016

Related U.S. Application Data (63) Continuation of application No. 14/335,354, filed on Jul. 18, 2014, now Pat. No. 9,462,103, which is a continuation of application No. 13/491,964, filed on Jun. 8, 2012, now Pat. No. 8,817,958, which is a continuation of application No. 12/333,729, filed on Dec. 12, 2008, now Pat. No. 8,218,744.

(51) Int. Cl.
| | |
|---|---|
| H04M 3/42 | (2006.01) |
| H04M 1/56 | (2006.01) |
| H04M 1/57 | (2006.01) |
| H04L 12/58 | (2006.01) |
| H04M 7/00 | (2006.01) |

(52) U.S. Cl.
CPC ...... *H04M 3/42068* (2013.01); *H04L 51/046* (2013.01); *H04M 1/56* (2013.01); *H04M 1/575* (2013.01); *H04M 1/576* (2013.01); *H04M 3/4211* (2013.01); *H04M 7/006* (2013.01)

(58) Field of Classification Search
CPC ............. H04M 3/42068; H04M 3/436; G06F 17/30008; G06Q 30/02
USPC ................ 370/352, 254; 379/93.17, 142.04, 379/265.09, 373.01, 88.2, 93.07, 207.02, 379/211.02, 218.01; 455/551, 435.1, 519, 455/550.1, 552.1; 705/14.19, 14.54; 709/204, 203
See application file for complete search history.

(56) References Cited

U.S. PATENT DOCUMENTS

| | | |
|---|---|---|
| 5,457,680 A | 10/1995 | Kamm et al. |
| 5,694,393 A | 12/1997 | Kaye |
| 5,717,830 A | 2/1998 | Sigler et al. |

(Continued)

*Primary Examiner* — Gerald Gauthier
(74) *Attorney, Agent, or Firm* — Guntin & Gust, PLC; Atanu Das (57) ABSTRACT

In embodiments of the disclosed technology, a plurality of ratings of websites is received, wherein each rating is associated with a category and a rater and each rater is associated with at least one group. A selection of a category is received from the user, wherein the user is associated with at least one group. One website location (or a plurality of website locations) is provided in the category to the user based on at least one rating of the plurality of ratings provided by at least one of the raters, wherein at least one group associated with the rater and at least one the group associated with the user are the same group.

20 Claims, 5 Drawing Sheets

(56) References Cited

U.S. PATENT DOCUMENTS

| | | | |
|---|---|---|---|
| 6,005,870 A | 12/1999 | Leung | |
| 6,240,069 B1 | 5/2001 | Alperovich et al. | |
| 6,310,944 B1 | 10/2001 | Brisebois | |
| 6,445,915 B1 | 9/2002 | Baiyor et al. | |
| 6,519,326 B1 | 2/2003 | Milewski et al. | |
| 6,611,501 B1* | 8/2003 | Owen | H04M 3/4217 370/254 |
| 6,668,055 B2 | 12/2003 | Marwell | |
| 6,768,792 B2 | 7/2004 | Brown | |
| 6,804,345 B1 | 10/2004 | Bala et al. | |
| 6,892,083 B2 | 5/2005 | Shostak | |
| 7,170,863 B1 | 1/2007 | Denman et al. | |
| 7,408,948 B2 | 8/2008 | Löppönen et al. | |
| 7,487,158 B2 | 2/2009 | Castro et al. | |
| 7,532,607 B1 | 5/2009 | Tofighbakhsh et al. | |
| 7,657,523 B2 | 2/2010 | Ebanks et al. | |
| 7,660,864 B2 | 2/2010 | Markki et al. | |
| 7,680,770 B1 | 3/2010 | Buyukkokten | |
| 7,688,966 B2* | 3/2010 | Kumar | H04M 3/5183 340/5.91 |
| 7,693,510 B2 | 4/2010 | Shaw et al. | |
| 7,787,607 B2 | 8/2010 | Chatterjee et al. | |
| 7,801,953 B1 | 9/2010 | Denman et al. | |
| 7,844,671 B1 | 11/2010 | Lawler | |
| 7,940,908 B2 | 5/2011 | Sprigg et al. | |
| 8,018,929 B2 | 9/2011 | Soles et al. | |
| 8,032,886 B2 | 10/2011 | Joy et al. | |
| 8,054,949 B2 | 11/2011 | Lee et al. | |
| 8,145,678 B2 | 3/2012 | Ramsay, Jr. et al. | |
| 8,218,744 B2 | 7/2012 | Belz et al. | |
| 8,271,631 B1 | 9/2012 | Horvitz et al. | |
| 8,275,119 B2 | 9/2012 | Kahn et al. | |
| 8,346,240 B2 | 1/2013 | Morales et al. | |
| 8,346,864 B1 | 1/2013 | Amidon et al. | |
| 8,498,865 B1 | 7/2013 | Shostak et al. | |
| 8,819,293 B2 | 8/2014 | Mobin et al. | |
| 8,977,250 B2 | 3/2015 | Malamud et al. | |
| 9,055,146 B2* | 6/2015 | Hansen | H04M 3/436 |
| 9,213,699 B2* | 12/2015 | Mukherjee | G06F 17/30008 |
| 2002/0094076 A1* | 7/2002 | Chen | H04M 1/57 379/373.01 |
| 2002/0141560 A1 | 10/2002 | Khayatan et al. | |
| 2002/0186828 A1* | 12/2002 | Bushnell | H04M 3/436 379/207.02 |
| 2003/0125072 A1* | 7/2003 | Dent | H04W 76/002 455/551 |
| 2004/0235509 A1* | 11/2004 | Burritt | H04M 3/42195 455/519 |
| 2004/0260701 A1 | 12/2004 | Lehikoinen et al. | |
| 2005/0105511 A1 | 5/2005 | Poikselka | |
| 2005/0233776 A1 | 10/2005 | Allen et al. | |
| 2005/0239485 A1 | 10/2005 | Kundu | |
| 2006/0062358 A1* | 3/2006 | Pearson | H04M 3/54 379/88.2 |
| 2007/0032261 A1* | 2/2007 | Boyer | H04M 1/72566 455/550.1 |
| 2007/0254653 A1* | 11/2007 | Bultinck | H04W 48/18 455/435.1 |
| 2007/0287474 A1 | 12/2007 | Jenkins et al. | |
| 2008/0021728 A1 | 1/2008 | Khoo | |
| 2008/0052344 A1* | 2/2008 | Alecci | H04M 3/12 709/203 |
| 2008/0082421 A1* | 4/2008 | Onyon | G06Q 30/02 705/14.19 |
| 2008/0130845 A1* | 6/2008 | Bose | H04L 69/24 379/93.07 |
| 2008/0148366 A1 | 6/2008 | Wahl | |
| 2008/0189292 A1* | 8/2008 | Stremel | G06Q 30/02 |
| 2008/0243607 A1 | 10/2008 | Rohan et al. | |
| 2008/0311951 A1* | 12/2008 | Camp, Jr. | H04M 3/54 455/552.1 |
| 2009/0017790 A1 | 1/2009 | Thalapaneni et al. | |
| 2009/0030985 A1* | 1/2009 | Yuan | H04L 67/306 709/204 |
| 2009/0031301 A1 | 1/2009 | D'Angelo et al. | |
| 2009/0034696 A1 | 2/2009 | Ramanathan et al. | |
| 2009/0037255 A1* | 2/2009 | Chiu | G06Q 30/0256 705/14.54 |
| 2009/0086720 A1* | 4/2009 | Westlake | H04L 12/66 370/352 |
| 2009/0144627 A1 | 6/2009 | O'Sullivan et al. | |
| 2009/0180602 A1* | 7/2009 | Ramanathan | H04M 3/42374 379/211.02 |
| 2009/0222348 A1 | 9/2009 | Ransom | |
| 2009/0276452 A1* | 11/2009 | Mukherjee | G06F 17/30008 |
| 2009/0285204 A1* | 11/2009 | Gallant | G06Q 20/102 370/352 |
| 2009/0307762 A1 | 12/2009 | Cudd et al. | |
| 2010/0027778 A1* | 2/2010 | Kumar | H04M 3/5232 379/265.09 |
| 2010/0049802 A1* | 2/2010 | Raman | G06F 17/30867 709/204 |
| 2010/0080376 A1 | 4/2010 | Hartley et al. | |
| 2010/0081461 A1 | 4/2010 | Bothra | |
| 2010/0104083 A1* | 4/2010 | Berman | H04M 3/4931 379/218.01 |
| 2010/0150327 A1* | 6/2010 | Belz | H04M 1/56 379/142.04 |
| 2011/0258275 A1 | 10/2011 | Rao et al. | |
| 2012/0250843 A1 | 10/2012 | Belz et al. | |

\* cited by examiner

METHOD FOR INDICATING THE CONTEXT OF A CALL TO A CALLED PARTY

CROSS-REFERENCE TO RELATED APPLICATIONS

This application is a Continuation of and claims priority to U.S. patent application Ser. No. 14/335,354, filed on Jul. 18, 2014, which is a Continuation of and claims priority to U.S. patent application Ser. No. 13/491,964, filed on Jun. 8, 2012, which is a Continuation of and claims priority to U.S. patent application Ser. No. 12/333,729, filed on Dec. 12, 2008. The contents of each of the foregoing are hereby incorporated by reference into this application as if set forth herein in full.

FIELD OF THE DISCLOSURE

The disclosed technology relates generally to online social networks and, more particularly, to methods of using information from social networks with a phone call.

BACKGROUND OF THE DISCLOSURE

Online social networks allow people to create profiles with data about themselves or relevant to themselves and share content with their friends or others connected to them. Such networks, in some form, date back to the 1970s and 1980s, while other new online social networks, whether they be mailing lists or entire platforms for exchanging content, are constantly being developed. Popular networks include Facebook, LinkedIn, MySpace, and MeetUp.com. Older networks typically consisted of mailing lists and the like, such as Yahoo Groups, Internet Newsgroups, Fidonet, and so forth. Sometimes, the fact that a person is a member of such a service indicates the group (i.e., a person who subscribes to the "New Jersey Lawyers Mailing List") is a member of a group of New Jersey lawyers. Alternately, a group can be indicated within the social network platform (i.e., a member of LinkedIn might join an "Animal Lovers" group and be listed amongst others who are members).

These groups are an improvement over e-mail by itself, because communication is, or can be, provided in the context of the group with which one is associated. An e-mail from someone on a mailing list typically indicates the name of the mailing list in the subject line. A message from a user on a social network typically displays, or can display, the name of a group in which both parties are members. These group designations are limited to their usages on the online social networks, In a different technology realm—the telephone—the device predates the online social networks. However, the telephone lacks the ability to designate a group. While ANI and CallerID (Caller Identification) protocols are known, such protocols only deliver to a called party a phone number, and sometimes a name, of a calling party. The called party will not know in what context the call is being made.

Prior art patents have attempted to bridge this gap. For example, U.S. Pat. No. 6,310,944 to Brisebois et al. discloses the generation of context information in phone calls, such location data, which may be given to a called party. U.S. Pat. No. 6,768,792 to Brown et al. discloses passing on data to the called party such as location, scheduling information, path of the call, billing information, and the like. U.S. Pat. No. 6,005,870 to Leung et al. discloses prompting the calling party to enter more information to be passed on to the called party. However, these inventions, while providing some context to the call, are often limited to general information (i.e., caller location) and cannot provide data indicating a specific relationship or joint group identity between the calling party and called party.

An object of the disclosed technology is to allow a user receiving a call to receive data indicating context of the call by exhibiting to the called party a group to which both the calling party and called party belong.

It is a further an object of the disclosed technology to send to the calling party group data gleaned from online social networks.

An embodiment of the disclosed technology includes indicating the context of a communication from a calling party to a called party. An online social network profile of each party is linked to a phone number associated with each respective party. At least one group associated with each profile is determined, and at least a name of the group is sent to the called party upon the calling party placing a call to the called party.

In an embodiment of the disclosed technology, a device is configured to indicate the context of a communication from a calling party to a called party. A data communication pathway exists between an online social network profile of each party and a phone system. An association device determines at least one group associated with each profile. A communication device sends (which may include initiating the sending of) at least a name of the group to the called party upon the calling party placing a call to the called party.

The device may further have a calling device for initiating and sending over a network, communication between the calling party and the called party. The communication may be over a phone network. The sending may comprise sending of CallerID information and/or sending an instant message.

DETAILED DESCRIPTION OF THE DRAWINGS

Embodiments of the disclosed technology allow a user who is receiving a call to receive data indicating context of the call by exhibiting to the called party an online social network group to which both the calling party and called party belong. The context of a communication from a calling party to a called party is determined based on the group associations in the online social network of the parties, such as their profiles, and each party is linked to a phone number associated with each respective party. When the call is made, the group association of both parties is sent with the call, such as with the CallerID information.

Figure 1:
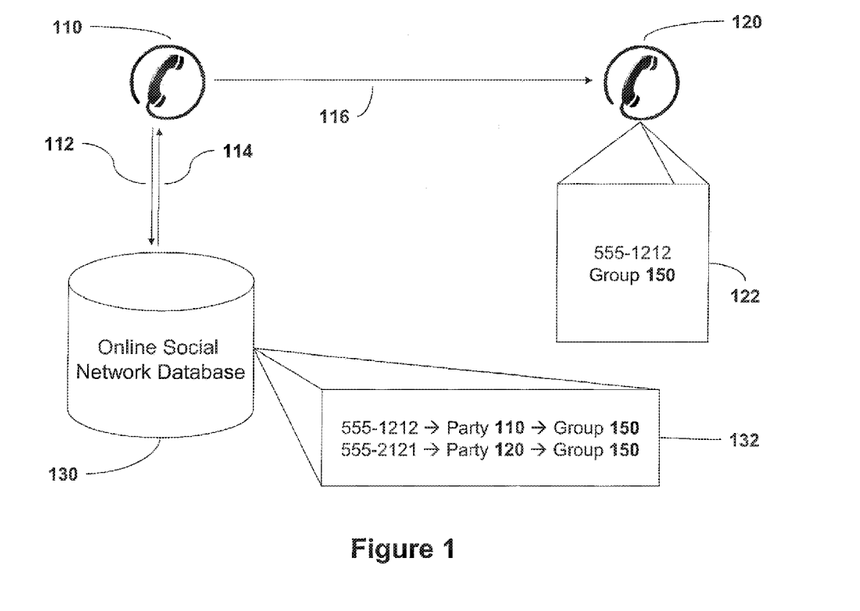
FIG. 1 shows a high level flowchart of devices and methods of embodiments of the disclosed technology.

FIG. 1 shows a high level flowchart involving embodiments of the disclosed technology. Calling Party 110 is a person, or device associated with a specific person, legal entity, device, or the like, which is associated with a specific phone number. Via data pathway 112, the calling party 110 queries an online social network database 130 with a phone number of the calling party 110 and a phone number of the party to be called, herein referred to as the called party 120. The Online Social Network Database 130 responds via data pathway 114 with the name of at least one group association of which both the calling party 110 and called party 120 are members.

Alternatively, the calling party 110, or a device associated with the calling party 110, such as a device of a service provider of the calling party, may already be populated with data, such as an online social network profile name of the calling party 110, and may query the database 130 for a group association of the called party 120, which also exists within the profile of the calling party 110.

Data pathway 112 and data pathway 114 may be the same data pathway or may be two separate pathways. The data pathways 112 and 114 may be anyone of, for example, a data link between a phone service provider and an Internet (packet switched) network connection, an internal network connection between two devices, or within the same device as a phone service provider (such as when data is cached locally), a connection between a device operated by the calling party 110 and an Internet connection, and so forth. Data pathway 114, though shown returning to the calling party 110, may, in fact, go directly to called party 120, for example, in that an instant message with at least group data is sent to the calling party. An instant message is a message which is designed to, or does, appear to or notify the recipient upon receipt by the recipient. This may take the form of a text message such as SMS (simple message syndication) or message sent over a service such as AIM, ICQ, or the like.

In an embodiment of the disclosed technology, no further actions are carried out. The recipient is simply notified of an attempt or desire on the part of the calling party 110 to place a call to the called party 120. The notification includes sending at least a name of a group to the called party upon the calling party placing a call (which includes any action, such as dialing the phone digits, selecting the user from a list, or clicking on a button to the call party) to the called party.

Referring still to FIG. 1, in another embodiment of the disclosed technology, a call is placed over a phone network 116 from the calling party 110 to the called party 120. Along with, or separate from the phone call, data is sent, such as within the CallerID (Caller Identification) protocol. The data includes at least a group name. The phone network 116 may be a POTS (plain old telephone service) system, a VoIP (Voice Over Internet Protocol) system, a combination of POTS and VoIP, or any other phone system configured to allow at least two parties to communicate aurally.

In the example shown in FIG. 1, the Online Social Network Database 130 comprises many entries 132. When queried with a phone number associated with a calling party 110, namely, "555-1212," it is determined that this number is associated with a profile of calling party 110. (Alternatively, and as partially described above, such a database may be queried with any identifier linking the calling party to his profile or entry within the online social network.) The database 130 is further queried with the number to be dialed, namely, 555-2121. In embodiments of the disclosed technology, the number is first converted into a desired format. For example, if a person dials a number, "011-972-2-555-2121," it may be desired to query the database with "02-555-2121" as, depending on where one is dialing from, the digits dialed are differently. Thus, in embodiments of the disclosed technology, even multiple queries may take place to determine either or both the profile of the calling party or called party, due to changes in the way a phone number is represented in different places or on different social network platforms.

Upon a successful query, the numbers lead to profiles. Here, 555-1212 will return a profile of calling party 110 and 555-2121 will return a profile of called party 120. Then, an intersection of groups of which the parties (i.e., their profiles) are members is queried. In this case, both calling party 110 and calling party 120 belong to group 150. Thus, at least the name of group 150 is returned as an answer to the query. It is this datum which is passed via data pathway 114 and/or 116 to the called party 120. Then, on a device such as a CallerID device 122 or any other electronic or aural means for exhibiting the data, the name of group 150 is exhibited to the called party.

Figure 3:
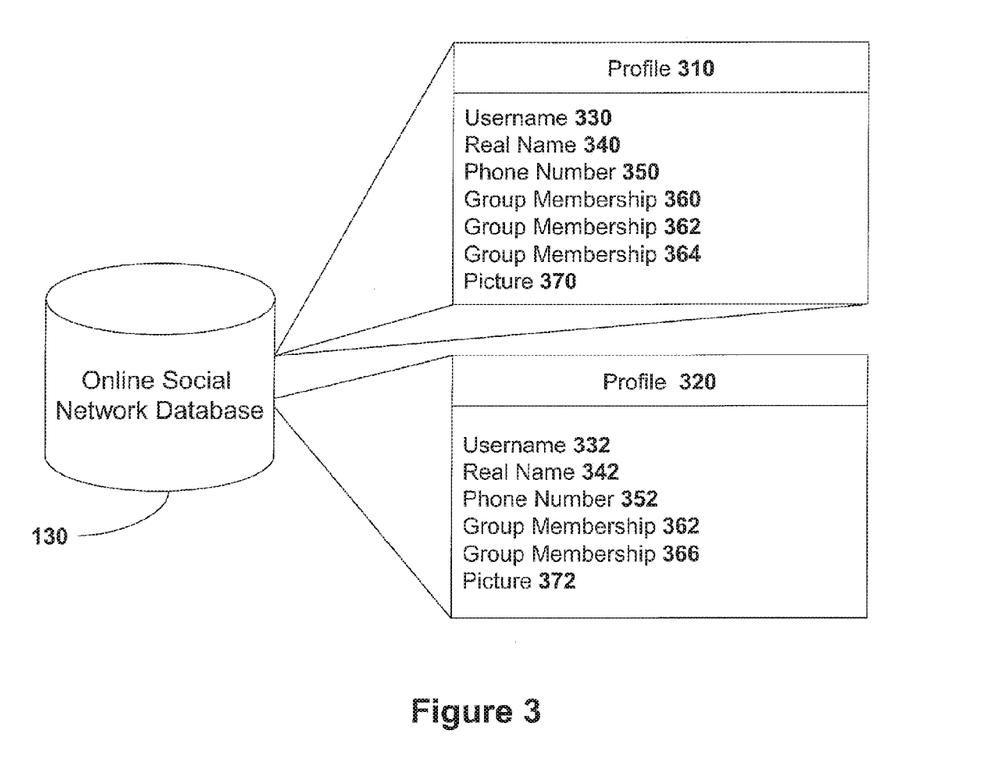
FIG. 3 shows data which may be retrieved from an online social network in an embodiment of the disclosed technology.

FIG. 3 shows data which may be retrieved from an online social network in an embodiment of the disclosed technology. The online social network database 130 (also shown in FIG. 1) is generally known in the art in various embodiments. As referenced in the "Background," common online social networks known in the art at the time of this writing include Facebook, LinkedIn, Meetup.com, e-mail mailing lists (such as Yahoo Groups or Mailman, the GNU Mailing List Manager), and so forth. Substantially any electronic method or device of connecting a plurality of users based on a common interest or common topic may be used in embodiments of the disclosed technology. Such a method or device need only have the ability to be queried with a phone number, username, or other identification of a calling party and return a group name and a phone number of a called party. In the case where the social network is a mailing list, the name of the mailing list may be the group name, and a script may be used to search for a phone number of a called party within messages sent to the mailing list, to determine that both the calling party and called party are members of such a group. The calling party may, before a phone call, initiate a search of such messages, in order to preconfigure phones numbers of those in the group.

Referring again to FIG. 3, profile 310 comprises data associated with calling party 110, and profile 320 comprises data associated with called party 320. These data may be stored in a database as is known in the art (such as MySQL, Oracle, MS Access, etc.) and/or may be garnered from e-mails or messages sent by users to a specific group. In the latter case, the group memberships 360, 362, 364, and/or 366 are populated with the name of the group from which the information was garnered. Profile 310 may comprise a username 330, real name 340, phone number 350, group memberships 360, 362, and 364, and a picture 370. Profile 320 may comprise a username 332, real name 342, phone number 352, group memberships 362 and 366, and picture 372.

Typically, a user of an online social network will have access to at least some profile data and/or messages sent by other users who are part of the same social group. Where access to at least a phone number of a called party is provided to a calling party (including a device associated with or put in action as a direct result of a phone call placed or attempted to be placed by a calling party), the calling party receives a response back from such a query of at least a phone number of the called party and can determine that the called party is in the same group. In the example shown in FIG. 3, calling party 110 has a profile 310, and called party 120 has a profile 320, which are both associated with group 362. Thus, when placing a call from calling party 110 to called party 120, the group membership 366 is sent to the called party. The sending may be or is initiated via CallerID or instant message, as described above.

Figure 2:
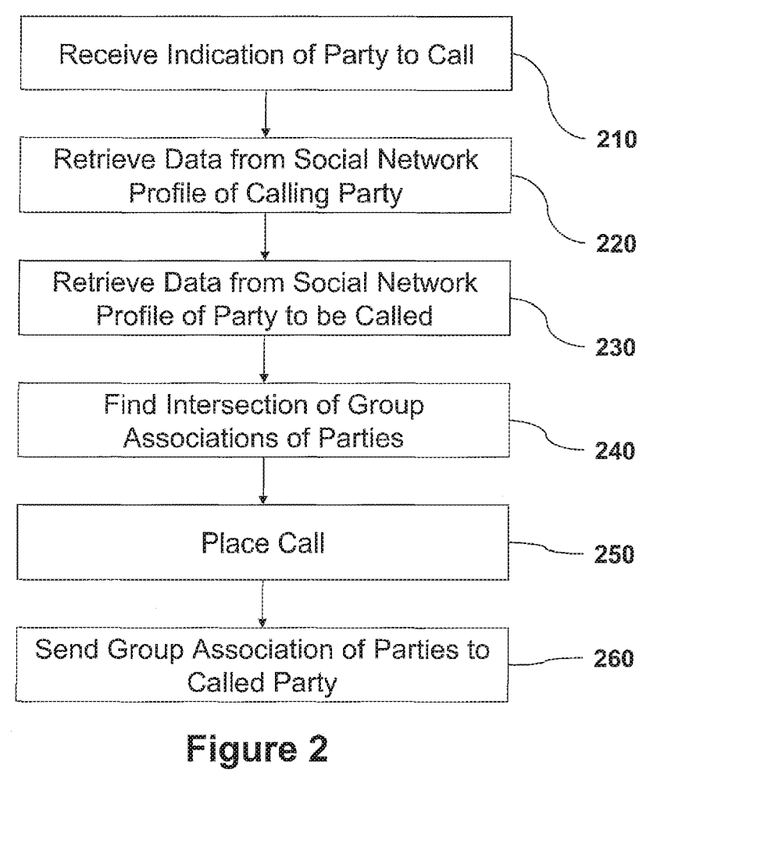
FIG. 2 shows a high level flow chart of a method of carrying out an embodiment of the disclosed technology from the perspective of a server.

FIG. 2 shows a high level flow chart of a method of carrying out an embodiment of the disclosed technology from the perspective of a server. In step 210, a server, such as a web server and/or a provider of a phone service, receives an indication of a party to call from a calling party, such as by receiving the digits to be dialed. This may occur by way of a calling party dialing digits into his/her cellular phone, POTS phone, VoIP phone, or a "soft" phone (i.e., a computer implemented method of dialing a phone number). In step 220, data are received from a social network profile associated with the calling party, such as the data shown in FIG. 3. In step 230, data are retrieved from a social network profile of the called party. The data retrieved may be sent to a device carrying out embodiments of the disclosed technology, or may be retrieved by the social network database for purposes of providing a group name to the server in which both the calling party and called party are members. This is accomplished in step 240, wherein the intersection of the memberships of the calling party and called party are found and returned in a query. After the query information has been returned, or concurrently with the query, in step 250 a call is placed from the calling party to the called party, and in step 260 the group association of the parties which was deduced in step 240, or at least a portion thereof, is sent to at least the called party. In this manner, the called party may be notified of the context of the calling party's phone call to the called party.

Figure 4:
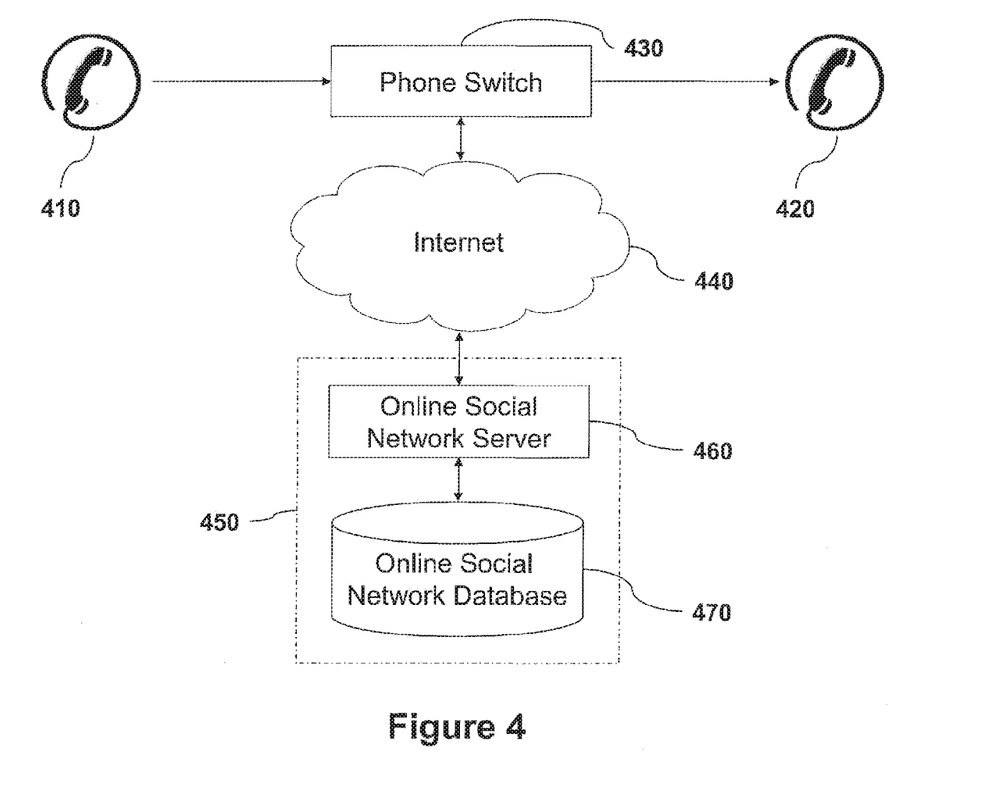
FIG. 4 shows a device on which embodiments of the disclosed technology may be carried out.

FIG. 4 shows a device on which embodiments of the disclosed technology may be carried out. Calling party 410 represents a handset or other calling device used to initiate voice communications (analog or digital) with another. Called party 420 represents a handset or other calling device used to receive voice communications (analog or digital) from another. A phone switch 430, situated on a network at a location between calling party 410 and called party 420 guides the call from the calling party 410 to the called party 420. The phone switch may be at a location of, or integrated with, the calling party 410 device, or may be at a location of a phone service provider. Before or while making the call, the phone switch 420, having Internet connectivity) or being pre-loaded with group information data—not shown), sends data over a packet switched network, such as the Internet 440, to an online social network 450. A server 460 of the online social network receives the request which comprises information about the calling party 410 and called party 420 (such as their phone numbers or other information as described above with reference to anyone of FIGS. 1-3). The server 460, which may be, or is integrated with, a unitary device with the online social network database 470, queries the online social network database for further information with regard to the profiles of the parties. This result of the query may be the name of a group to which both parties belong. Such resulting data may then be sent back over the Internet 440 to the phone switch 430, which passes the group information along to the called party 420, such as in the form of CallerID information or an instant message, as described above. A called party 420 device then exhibits the group information to the called party, informing the called party of a context of the call.

Figure 5:
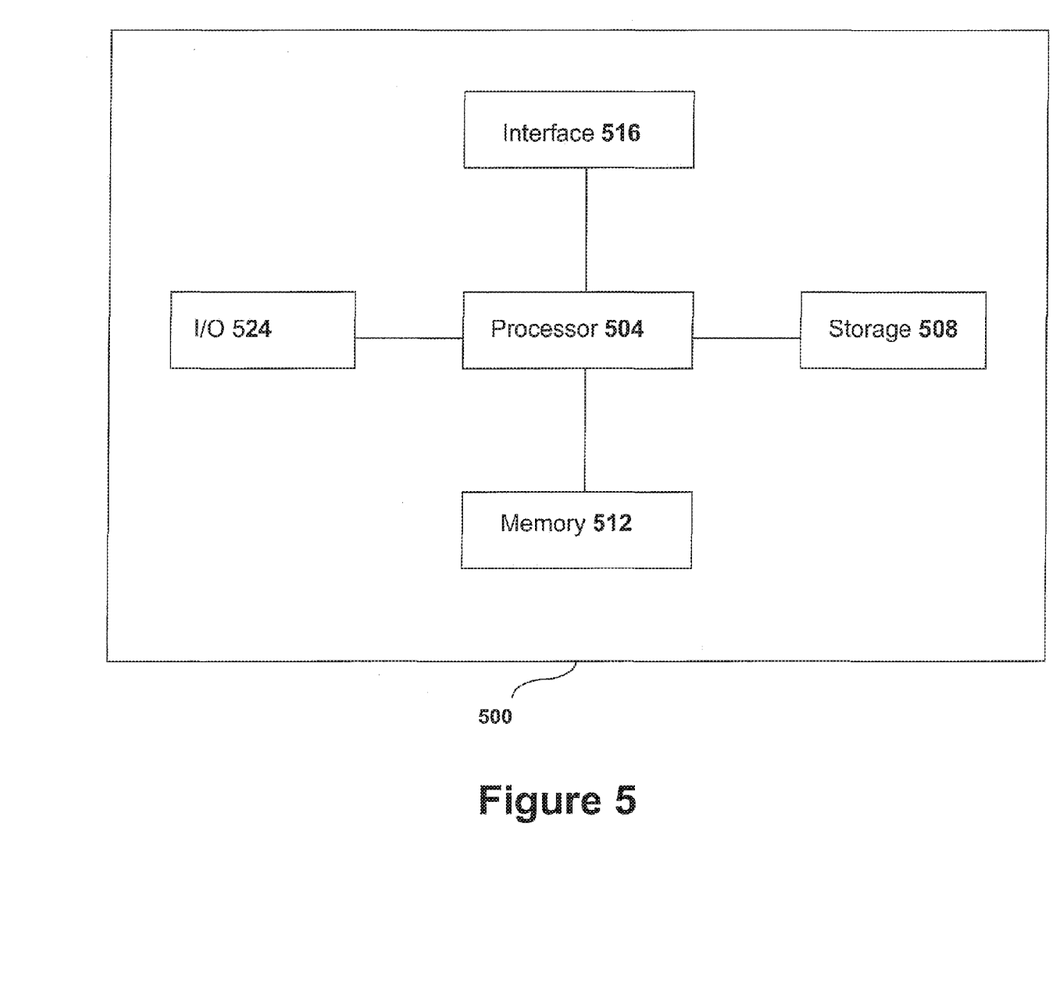
FIG. 5 shows a high-level block diagram of a computer that may be used to carry out the disclosed technology.

FIG. 5 shows a high-level block diagram of a computer that may be used in practicing the disclosed technology. Computer 500 contains a processor 504 that controls the overall operation of the computer by executing computer program instructions which define such operation. The computer program instructions may be stored in a storage device 508 (e.g., magnetic disk, database) and loaded into memory 512 when execution of the computer program instructions is desired. Thus, the computer operation will be defined by computer program instructions stored in memory 512 and/or storage 508, and the computer will be controlled by processor 504 executing the computer program instructions. Computer 500 also includes one or a plurality of input network interfaces for communicating with other devices via a network (e.g., the Internet). Computer 500 also includes one or more output network interfaces 516 for communicating with other devices. Computer 500 also includes input/output 524, representing devices which allow for user interaction with the computer 500 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes. It should also be understood by one skilled in the art that the method and devices depicted in FIGS. 1 through 4 may be implemented on a device such as is shown in FIG. 5.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A server device, comprising:
   a processing system including a processor; and
   a memory that stores executable instructions that when executed by the processing, facilitate performance of operations, comprising:
   sending a request for user profile information to a social network server;
   identifying contact information for a called party from a plurality of group messages;
   initiating a telecommunication session between a calling party and the called party according to the contact information;
   receiving, from the social network server, user profile information associated with the calling party and the called party of the telecommunication session according to identification information associated with the calling party and the called party;
   determining group membership information from the user profile information;
   providing the group membership information as a message to a called party's user device, wherein the message comprises an instant message that is received by the called party's user device before the telecommunication session is connected; and
   transmitting a profile picture to the called party's user device, wherein the user profile information further comprises the profile picture.

2. The server device of claim 1, wherein the telecommunication session is a voice over Internet Protocol (VoIP) communication session.

3. The server device of claim 1, wherein the request is sent responsive to initiation of the telecommunication session by a calling party's user device, wherein the initiation comprises a selection, at a calling party's communication device, of the called party from a contact list.

4. The server device of claim 1, wherein the identification information comprises phone numbers without names of the calling party and the called party.

5. The server device of claim 1, wherein the identification information comprises names of the calling party and the called party.

6. The server device of claim 1, wherein the operations further comprise:
identifying a location of a calling party's user device; and
providing the location of the calling party's user device in the message.

7. The server device of claim 1, wherein the operations further comprise
adjusting the identification information associated based on a location of a calling party's user device to generate adjusted identification information; and
providing a query to the social network server based on the adjusted identification information.

8. The server device of claim 7, wherein the adjusted identification information comprises a phone number without names of the calling party and the called party.

9. The server device of claim 1, wherein the operations further comprise:
generating multiple versions of the identification information; and
sending multiple queries to the social network server based on multiple versions of the identification information.

10. A method comprising:
receiving, by a processing system including a processor, a request for user profile information from a network server;
identifying contact information for a called party from a plurality of group messages;
initiating a telecommunication session between a calling party and the called party according to the contact information;
accessing, by the processing system, the user profile information associated with the calling party and the called party of the telecommunication session based on identification information;
identifying, by the processing system, a common membership group for the called party and calling party based on the user profile information;
transmitting, by the processing system, an identifier for the common membership group to the network server to cause the network server to provide the identifier for the common membership group to a recipient user device of the called party, wherein the identifier is sent in an instant message to the recipient user device of the called party before the telecommunication session is connected; and
sending, by the processing system, a profile picture to the recipient user device via the network server, wherein the user profile information further comprises the profile picture.

11. The method of claim 10, wherein the telecommunication session is a voice over Internet Protocol (VoIP) communication session.

12. The method of claim 10, wherein the request is sent responsive to initiation of the telecommunication session by a sender end device of the calling party.

13. The method of claim 10, wherein the identification information comprises phone numbers without names of the calling party and the called party.

14. The method of claim 10, further comprising:
identifying, by the processing system, a location of a sender user device of the calling party; and
providing, by the processing system, the location of the sender user device of the calling party to recipient user device via the network server.

15. The method of claim 10, wherein the accessing of the user profile information further comprises:
adjusting, by the processing system, the identification information based on a location of a sender user device of the calling party to generate adjusted identification information; and
providing, by the processing system, a query to a social network database based on the adjusted identification information.

16. The method of claim 10, wherein the accessing of the user profile information comprises utilizing, by the processing system, multiple queries based on multiple versions of the identification information.

17. The method of claim 16, wherein a first version of the multiple versions of the identification information is generated based on a location of a sender end device of the calling party.

18. A first device, comprising:
a display;
a processing system including a processor; and
a memory that stores executable instructions that, when executed by the processing system, facilitate performance of operations comprising:
receiving group membership information via an instant message associated with a first party and a second party, wherein the group membership information is determined via user profile information at a social network server according to identification information associated with a called party and a calling party of a telecommunication session, and wherein the first device is associated with one of the calling party, the called party, or a combination thereof, wherein contact information for the called party is identified from a plurality of group messages, and wherein the telecommunication session is initiated between the calling party and the called party according to the contact information;
obtaining a profile picture of the calling party; and
presenting the group membership information and the profile picture of the calling party at the display.

19. The first device of claim 18, wherein the telecommunication session is a voice over Internet Protocol (VoIP) communication session.

20. The first device of claim 18, wherein the identification information for the called party comprises a phone number without a name of the called party.

* * * * *